United States Patent
Sugunan et al.

(10) Patent No.: US 10,652,296 B2
(45) Date of Patent: May 12, 2020

(54) METHOD AND APPARATUS TO EFFICIENTLY SMOOTH ADAPTIVE CONTENT PLAYBACK IN HTTP LIVE STREAMING

(71) Applicant: ARRIS Enterprises LLC, Suwanee, GA (US)

(72) Inventors: Remesh Kousalya Sugunan, Bangalore (IN); William P. Franks, San Diego, CA (US); Nithin Raj Kuyyar Ravindranath, Bangalore (IN); Vinod Jatti, Bangalore (IN); Praveen Girish, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 26 days.

(21) Appl. No.: 15/727,062

(22) Filed: Oct. 6, 2017

(65) Prior Publication Data

US 2019/0109883 A1    Apr. 11, 2019

(51) Int. Cl.
| | |
|---|---|
| *G06F 15/16* | (2006.01) |
| *H04L 29/06* | (2006.01) |
| *H04N 21/24* | (2011.01) |
| *H04N 21/2343* | (2011.01) |
| *H04L 29/08* | (2006.01) |

(52) U.S. Cl.
CPC ........ *H04L 65/602* (2013.01); *H04L 65/4084* (2013.01); *H04L 65/4092* (2013.01); *H04L 65/607* (2013.01); *H04L 65/80* (2013.01); *H04N 21/234309* (2013.01); *H04N 21/2402* (2013.01); *H04L 67/02* (2013.01)

(58) Field of Classification Search
CPC ........... H04N 21/8456; H04N 21/2662; H04N 21/23439; H04N 21/2387; H04N 21/84; H04N 21/2353; H04L 65/4084; H04L 65/607; H04L 65/80; H04L 67/02; H04L 67/42; H04L 65/4076
See application file for complete search history.

(56) References Cited

U.S. PATENT DOCUMENTS

| | | | | |
|---|---|---|---|---|
| 2005/0213502 | A1* | 9/2005 | Convertino | ........... H04L 1/0014 370/229 |
| 2005/0232497 | A1* | 10/2005 | Yogeshwar | ............ H04N 19/56 382/232 |
| 2014/0089469 | A1* | 3/2014 | Ramamurthy | .......... H04L 65/60 709/219 |

(Continued)

FOREIGN PATENT DOCUMENTS

EP    2750394 A2    7/2014

*Primary Examiner* — Michael A Keller
*Assistant Examiner* — Thao D Duong
(74) *Attorney, Agent, or Firm* — Thomas A. Ward

(57) ABSTRACT

A system is provided that is designed to smooth and reduce the transition time of a live stream while switching to different bitrate transcode profiles. This accomplishment is achieved by avoiding pre buffer time using parallel transcode sessions and enabling a fast response to network congestion, as desired bitrate chunks/segments are readily available. The client, for example the HLS client, is not aware of switching the bitrate and is not taxed with any demands, as only the HLS server needs to manage synchronization of any pre-transcoded content and continue with further transcoding of the content.

6 Claims, 7 Drawing Sheets

(56) References Cited

U.S. PATENT DOCUMENTS

| | | | |
|---|---|---|---|
| 2014/0189141 A1* | 7/2014 | Kim | H04L 65/602 |
| | | | 709/231 |
| 2014/0344468 A1 | 11/2014 | Saremi | |
| 2015/0032851 A1* | 1/2015 | Lieber | H04L 65/602 |
| | | | 709/219 |
| 2015/0058494 A1* | 2/2015 | Sharif-Ahmadi | G08C 17/02 |
| | | | 709/231 |
| 2016/0285943 A1* | 9/2016 | Su | H04L 65/607 |

\* cited by examiner

```
#EXTM3U
#EXT-X-VERSION: 3
#EXT-X-TARGETDURATION: 2
#EXT-X-MEDIA-SEQUENCE: 66
#EXTINF: 2,
Chunk66.ts
#EXTINF: 2
Chunk67.ts
#EXTINF: 2
Chunk68.ts
#EXT-X-ENDLIST
```

METHOD AND APPARATUS TO EFFICIENTLY SMOOTH ADAPTIVE CONTENT PLAYBACK IN HTTP LIVE STREAMING

FIELD

Disclosed herein is a system to smooth and reduce the transition time while switching to different bitrate transcode profiles when live streaming content. The technique does not demand any change on the client, and only the server needs to manage synchronization of pre-transcoded content and continue with further transcoding of content.

BACKGROUND

HTTP live streaming is now wide-spread in industry. The set top can act as an HLS server and create variant bit rate streams and an HLS feature can allow switching playlist files based on available network bandwidth. A set top gateway box has an HLS server especially used for streaming video to multiple mobile client devices either in home or out of home. Out of Home streaming also adds up network delay causing delay to display first video frame at end device. For better user experience, delay in streaming startup should be reduced. One of factor to consider is to reduce pre buffer time at HLS server while streaming video content.

When HTTP live streaming, for every content, the server maintains different playlists with different bit rates (quality) indicating different files. The client downloads these playlist files. Then a client determines available network bandwidth and selects files from the appropriate playlist and plays them one by one (single content is split into several file chunks which are specified within a playlist). The client periodically monitors bandwidths, downloads/updates playlist files and plays accordingly.

Systems currently in the art implement server-side controlled adaptive streaming in a chosen VMS platform. In embodiments, the VMS Server will monitor the network bandwidth, network buffer read and write status of the client and adjust the transcoder configuration to output at the desired rate. This requires only one VMS transcoder resource for any playback request from client boxes.

However, a problem with server controlled adaptive streaming techniques is that while switching between different bitrate profiles, the pre-buffer time results in delays adapting to desired bitrate profile. This can be avoided by using an idle transcoder unit as a standby while switching to different bitrates. This includes dynamic change/update in playlist file only while switching to desired bitrate profile. Different playlist files depending upon bitrate (quality) are stored on the server, and the set top client fetches files from playlist. Table 1 shows different profiles for content which has different playlists associated with each of them.

TABLE 1

| | | Stream | Container | Codec | Type | Resolution | FPS | Bit Rate |
|---|---|---|---|---|---|---|---|---|
| Profile # | | 1SPTS | MPEG2-TS | AVC | High 4.1 | 1920 x 1080 | 29.97 | 6.750 |
| | | 2SPTS | MPEG2-TS | AVC | High 4.1 | 1920 x 1080 | 29.97 | 4.500 |
| | | 3SPTS | MPEG2-TS | AVC | High 4.1 | 1920 x 1080 | 29.97 | 3.000 |
| | | 4SPTS | MPEG2-TS | AVC | High 4.1 | 1280 x 720 | 29.97 | 4.125 |
| | | 5SPTS | MPEG2-TS | AVC | High 4.1 | 1280 x 720 | 29.97 | 2.750 |
| | | 6SPTS | MPEG2-TS | AVC | Main 3.0 | 1280 x 720 | 29.97 | 2.500 |
| | | 7SPTS | MPEG2-TS | AVC | Main 3.0 | 854 x 480 | 29.97 | 1.500 |
| | | 8SPTS | MPEG2-TS | AVC | Main 3.0 | 854 x 480 | 29.97 | 1.000 |
| | | 9SPTS | MPEG2-TS | AVC | Main 3.0 | 640 x 360 | 29.97 | 0.600 |
| | | 10SPTS | MPEG2-TS | AVC | Main 3.0 | 416 x 240 | 29.97 | 0.250 |
| | | 11SPTS | MPEG2-TS | AVC | Main 3.0 | 640 x 480 | 29.97 | 1.250 |
| | | 12SPTS | MPEG2-TS | AVC | Main 3.0 | 640 x 480 | 29.97 | 0.900 |
| | | 13SPTS | MPEG2-TS | AVC | Main 3.0 | 480 x 360 | 29.97 | 0.500 |
| | | 14SPTS | MPEG2-TS | AVC | Main 3.0 | 320 x 240 | 29.97 | 0.250 |
| | | 15SPTS | MPEG2-TS | AVC | Base 3.0 | 848 x 480 | 29.97 | 0.700 |
| | | 16SPTS | MPEG2-TS | AVC | Base 3.0 | 640 x 480 | 29.97 | 1.200 |
| | | 17SPTS | MPEG2-TS | AVC | Base 3.0 | 640 x 480 | 29.97 | 0.900 |
| | | 18SPTS | MPEG2-TS | AVC | Base 3.0 | 480 x 320 | 29.97 | 0.900 |
| | | 19SPTS | MPEG2-TS | AVC | Base 3.0 | 480 x 320 | 29.97 | 0.600 |

All the playlist files are stored as different playlist files (for example, m3u8 format) located by a different URI. Set tops and mobile clients can download different playlist files associated with different bit rates. As this playlist file content gets dynamically updated on the server, the client set top also connects to server periodically to get these playlist files and compare if they are changed, and then use that information accordingly. The periodicity of playlist refresh at the client is described in standard document: "HTTP Live streaming draft-pantos-http-live-streaming-05" section 6.3.4.

However, problems arise, for example, in case of DVR asset playback from an HLS server to a client. In such an example, content is transcoded to a client-supported profile and the HLS chunks are created on the fly and an m3u8 playlist file is generated. For smooth playback, there can be pre-buffer of 3 transcoded chunks. This adds up waiting time for mobile client to display first video frame. For example, if the one chunk duration is of a 2 second duration and the pre buffer is of 3 chunks, then the total pre buffer added time is 2×3=6 seconds. When network congestion is detected, the rate switch occurs to a lower bitrate variant, but the client could not experience the switch down in the bitrate due to the available chunks of higher bitrate which already exist due to the previously described prebuffering technique in the pipeline. This worsens the network congestion as the state is already bad and the client has to further consume this high bitrate content for the duration of the prebuffer. Client side stabilization in this case can take ~6 sec (which is equal to the pre buffer time). This is an excessive delay. During this time, content play on the client device will experience video macroblock or jitter or some type of disruption.

The embodiments described herein solve these problems by making use of the idle transcoders that are used as standby resources to support smooth switching to desired bandwidth (see FIG. 3 and the associated sections, below).

Disclosed herein is a system to smooth and reduce the transition time while switching to different bitrate transcode profiles. This is achieved in a few ways, including avoiding pre buffer time using parallel transcode sessions, enabling a fast response to Network congestion, as desired bitrate chunks/segments are readily available. This is a more simple approach as the client, for example, an HLS client, is not aware of switching the bitrate.

The proposed technique does not demand any change in the HLS client as the client is not aware of any pre-transcoded content and playlist file. Only the HLS server needs to manage synchronization of pre-transcoded content and continues with the further transcoding of content.

SUMMARY

Embodiments of the present invention provide a system that is designed to smooth and reduce the transition time of a live stream while switching to different bitrate transcode profiles. This accomplishment is achieved by avoiding pre buffer time using parallel transcode sessions and enabling a fast response to network congestion, as desired bitrate chunks/segments are readily available. The client, for example the HLS client, is not aware of switching the bitrate and is not taxed with any demands, as only the HLS server needs to manage synchronization of any pre-transcoded content and continue with further transcoding of the content.

In one embodiment, the system includes a real-time transcoding method to provide content by a server to a user. The method includes the steps of initiating a transcoding session from the server to the user; providing playlist files with a current user-supported profile to the server; setting a current session bitrate profile based on the current user-supported profile; and identifying one or more transcoder units as standby transcoder units.

BRIEF DESCRIPTION OF THE DRAWINGS

The details of the present disclosure, both as to its structure and operation, may be understood in part by study of the accompanying drawings, in which like reference numerals refer to like parts. The drawings are not necessarily to scale, emphasis instead being placed upon illustrating the principles of the disclosure.

DETAILED DESCRIPTION

An example embodiment of the present invention and its potential advantages are best understood by referring to FIGS. 1-7 of the drawings, like numerals being used for like and corresponding parts of the various drawings. The FIGS. 1-7, discussed below, and the various embodiments used to describe the principles of the present disclosure are by way of illustration only and should not be construed in any way to limiting the scope of the disclosure. Those skilled in the art will understand the principles of the present disclosure may be implements in any suitably arranged mobile communication device, server and clients.

The embodiments disclosed herein solve the problems described above, by smoothening and reducing the transition time while switching to different bitrate transcode profiles. This is achieved by: avoiding pre buffer time using parallel transcode sessions, achieving a fast response to Network congestion, as the desired bitrate chunks/segments are readily available. As notes above, this approach is more simple because the client is not aware of switching the bitrate and is not required to do anything.

Figure 1:
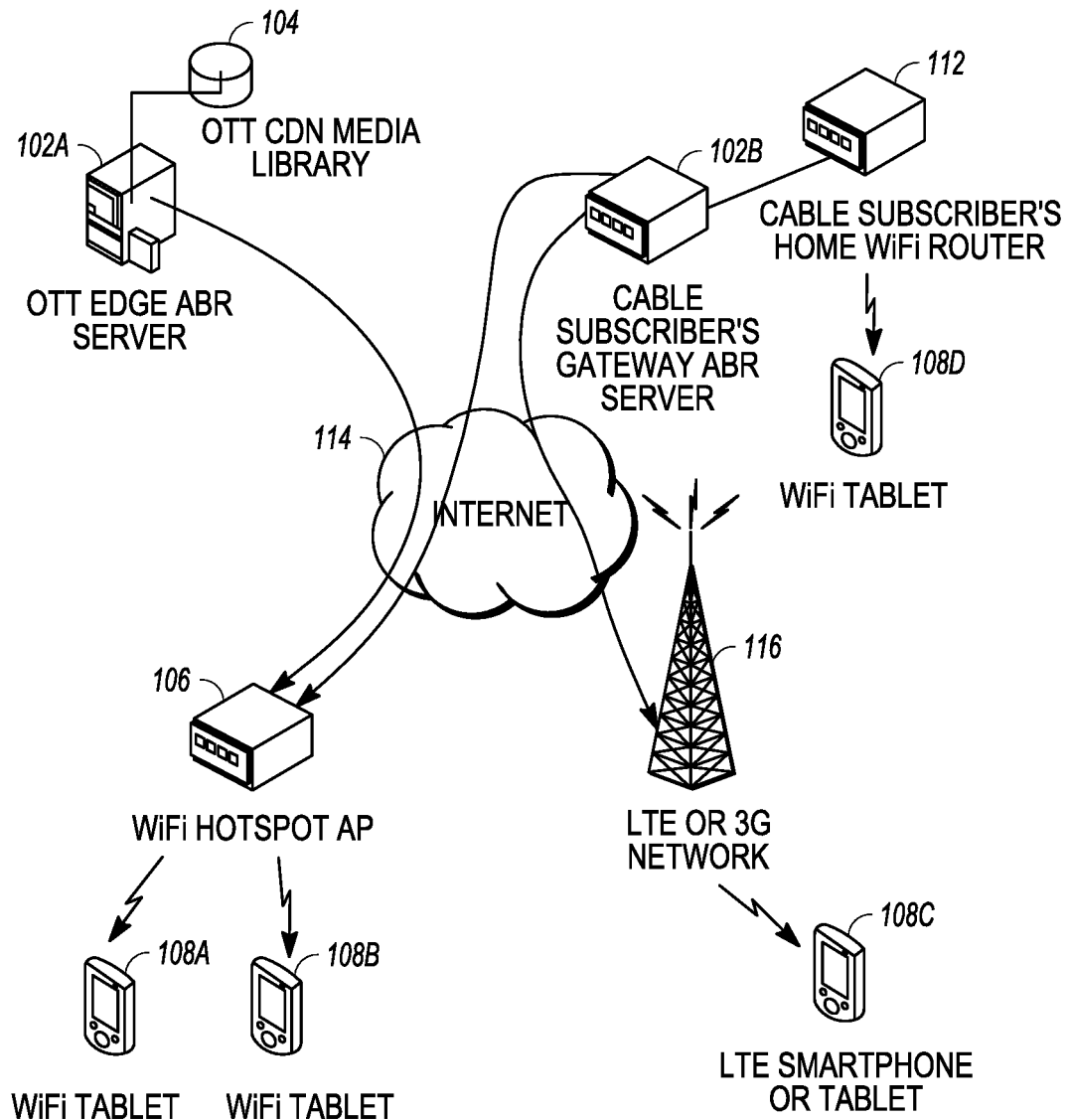
FIG. 1 is a diagram illustrating an exemplary architecture for server-side adaptive bit rate (ABR) control of a media streaming session.

FIG. 1 is a diagram illustrating an exemplary architecture 100 for server-side adaptive bit rate (ABR) control of a media streaming session. In the illustrated embodiment, the architecture 100 comprises an ABR server 102A that can be implemented in edge servers for over-the-top (OTT) delivery of cached media streams contained, for example, at content distribution network (CDN) storage servers 104. In one embodiment, the OTT edge ABR server 102 operates on mezzanine content which is media prepared at high quality and high bit rate which might not be suitable for delivery over bandwidth (BW) constrained networks. The ABR server may also be embodied by a consumer's gateway (GW) device 102B connected in their home to a cable, telco, satellite or other Internet protocol (IP) multiple-system operator (MSO) network operating on content processed. This subscriber gateway device 102B could have hard-disk drive (HDD) storage and/or digital video recorder (DVR) capability to receive, store, and retrieve content delivered over the MSO network for playback. The consumers GW device 102B would also provide ABR transcoding control for live tuned streams received from the MSO network. Hereinafter, the OTT Edge ABR server and customer's GW ABR server may alternately be referred collectively as ABR server(s) 102.

In both of these example server-side embodiments, the ABR server 102 provides the media streams to wireless or wired clients 108A-108D (alternatively collectively referred to hereinafter as clients(s) 108) over bandwidth constrained IP networks such as the Internet 114. The media streams are transcoded or transrated by the ABR server 102 to fit the network bandwidth available to the client 108. The ABR server 102 measures this bandwidth as the clients 108 request and download media data or segments using HTTP. The clients 108 may be in the user or subscriber's home and retrieve content over the home WiFi network implemented by WiFi router 112 from the subscriber's cable gateway ABR server 102B or they may be remote and retrieve the content through the Internet via a WiFi hotspot 106 or LTE/3G cellular network 116 from the home gateway 102B or OTT ABR edge server 102A. The transcoded media files may be segmented and formatted for delivery using any standard HTTP streaming segmented file format including, but not limited to, Apple HTTP Live Streaming (HLS), Microsoft Smooth Streaming (MSS), MPEG Dynamic Adaptive Streaming over HTTP (DASH), and Adobe HTTP Dynamic Streaming (HDS).

Importantly, the methods and systems described below differ from conventional adaptive bit rate schemes and standards currently in use to deliver media over IP. Protocols and standards such as DASH, HLS, MSS or HDS typically implement adaptation on the client side by requiring the streaming client to measure it's available received network bandwidth and choose a media stream of appropriate bit rate from a master playlist or manifest file containing multiple bit rate options (in HLS terminology a media playlist contains a list of uniform resource identifiers (URIs) that are addresses to media segments while a master playlist contains URIs that are addresses to media playlists). This often requires a storage network 104 or gateway 102B to create and maintain, in advance of the request for the media program many bit rate variants of a media asset. This can be a cost/complexity burden for low cost consumer gateway devices that may have only one, or a few, transcoder engine(s) that must be shared among multiple streaming clients. The systems and methods described below removes some or all of the control and bit-rate decision-making from the client-side and positions it on the server-side for just-in-time (JIT) creation of media streams that fit the available bandwidth to individual client devices. Only one transcoder instance is needed per client and, as well, server-side storage of multiple variants of a given media asset are replaced with the need for storing only one variant from which to make all JIT adaptive streams.

Figure 2:
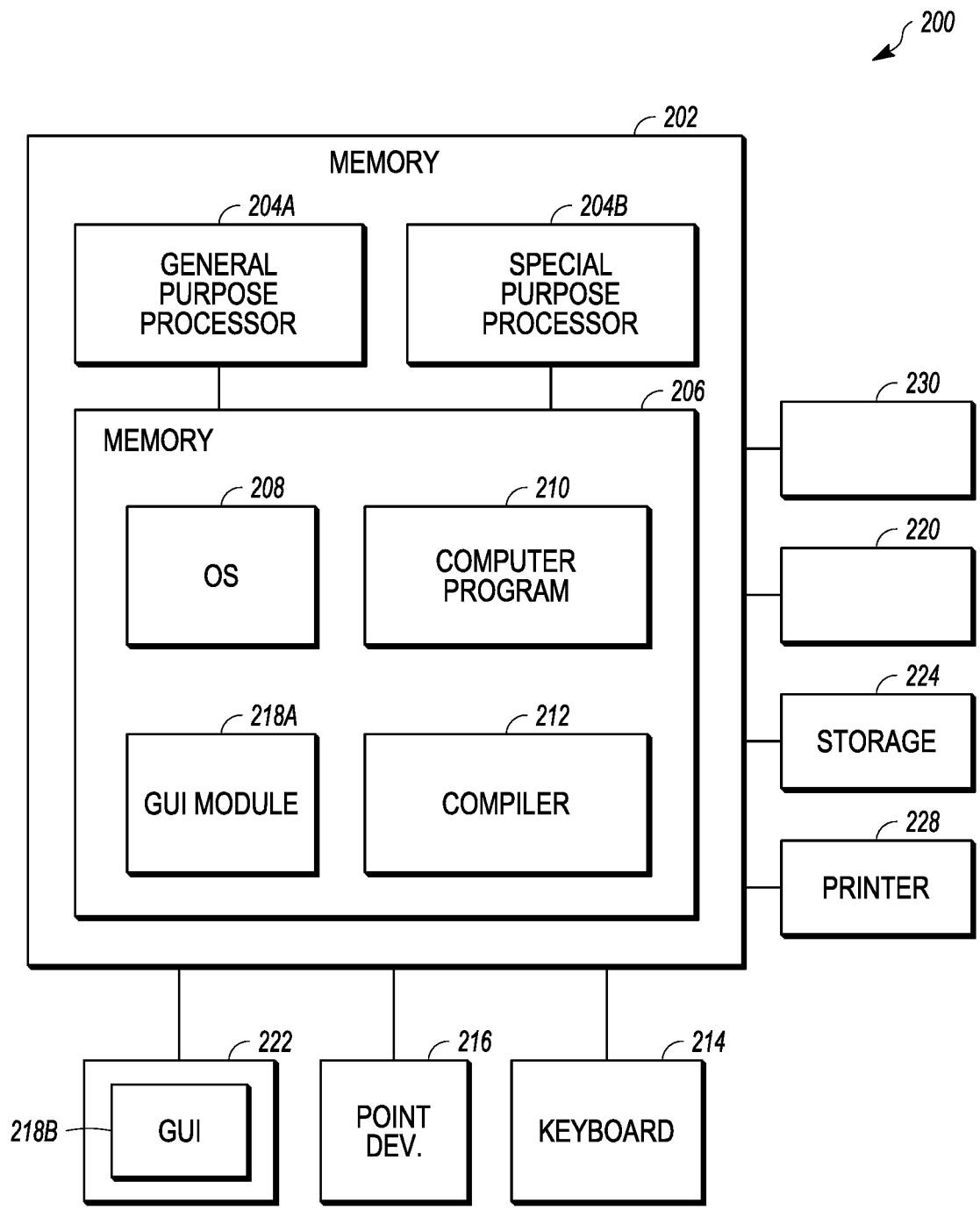
FIG. 2 is a diagram illustrating an exemplary computer system that could be used to implement elements of the present invention.

FIG. 2 is a diagram illustrating an exemplary computer system 200 that could be used to implement elements of the present invention, including the ABR server 202, client 204, and elements thereof. The computer 202 comprises a general purpose hardware processor 204A and/or a special purpose hardware processor 204B (hereinafter alternatively collectively referred to as processor 204) and a memory 206, such as random access memory (RAM). The computer 202 may be coupled to other devices, including input/output (I/O) devices such as a keyboard 214, a mouse device 216 and a printer 228.

In one embodiment, the computer 202 operates by the general purpose processor 204A performing instructions defined by the computer program 210 under control of an operating system 208. The computer program 210 and/or the operating system 208 may be stored in the memory 206 and may interface with the user and/or other devices to accept input and commands and, based on such input and commands and the instructions defined by the computer program 210 and operating system 208 to provide output and results.

Output/results may be presented on the display 222 or provided to another device for presentation or further processing or action. In one embodiment, the display 222 comprises a liquid crystal display (LCD) having a plurality of separately addressable pixels formed by liquid crystals. Each pixel of the display 222 changes to an opaque or translucent state to form a part of the image on the display in response to the data or information generated by the processor 204 from the application of the instructions of the computer program 210 and/or operating system 208 to the input and commands. Other display 222 types also include picture elements that change state in order to create the image presented on the display 222. The image may be provided through a graphical user interface (GUI) module 218A. Although the GUI module 218A is depicted as a separate module, the instructions performing the GUI functions can be resident or distributed in the operating system 208, the computer program 210, or implemented with special purpose memory and processors.

Some or all of the operations performed by the computer 202 according to the computer program 210 instructions may be implemented in a special purpose processor 204B. In this embodiment, some or all of the computer program 210 instructions may be implemented via firmware instructions stored in a read only memory (ROM), a programmable read only memory (PROM) or flash memory within the special purpose processor 204B or in memory 206. The special purpose processor 204B may also be hardwired through circuit design to perform some or all of the operations to implement the present invention. Further, the special purpose processor 204B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 202 may also implement a compiler 212 which allows an application program 210 written in a programming language such as COBOL, C++, FORTRAN, or other language to be translated into processor 204 readable code. After completion, the application or computer program 210 accesses and manipulates data accepted from I/O devices and stored in the memory 206 of the computer 202 using the relationships and logic that was generated using the compiler 212.

The computer 202 also optionally comprises an external communication device such as a modem, satellite link, Ethernet card, or other device for accepting input from and providing output to other computers.

In one embodiment, instructions implementing the operating system 208, the computer program 210, and/or the compiler 212 are tangibly embodied in a computer-readable medium, e.g., data storage device 220, which could include one or more fixed or removable data storage devices, such as a zip drive, floppy disc drive 224, hard drive, CD-ROM drive, tape drive, or a flash drive. Further, the operating system 208 and the computer program 210 are comprised of computer program instructions which, when accessed, read and executed by the computer 202, causes the computer 202 to perform the steps necessary to implement and/or use the present invention or to load the program of instructions into a memory, thus creating a special purpose data structure causing the computer to operate as a specially programmed computer executing the method steps described herein. Computer program 210 and/or operating instructions may also be tangibly embodied in memory 206 and/or data communications devices 230, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 202.

Although the term "computer" is referred to herein, it is understood that the computer may include portable devices such as cellphones, portable MP3 players, video game consoles, notebook computers, pocket computers, or any other device with suitable processing, communication, and input/output capability.

Figure 3:
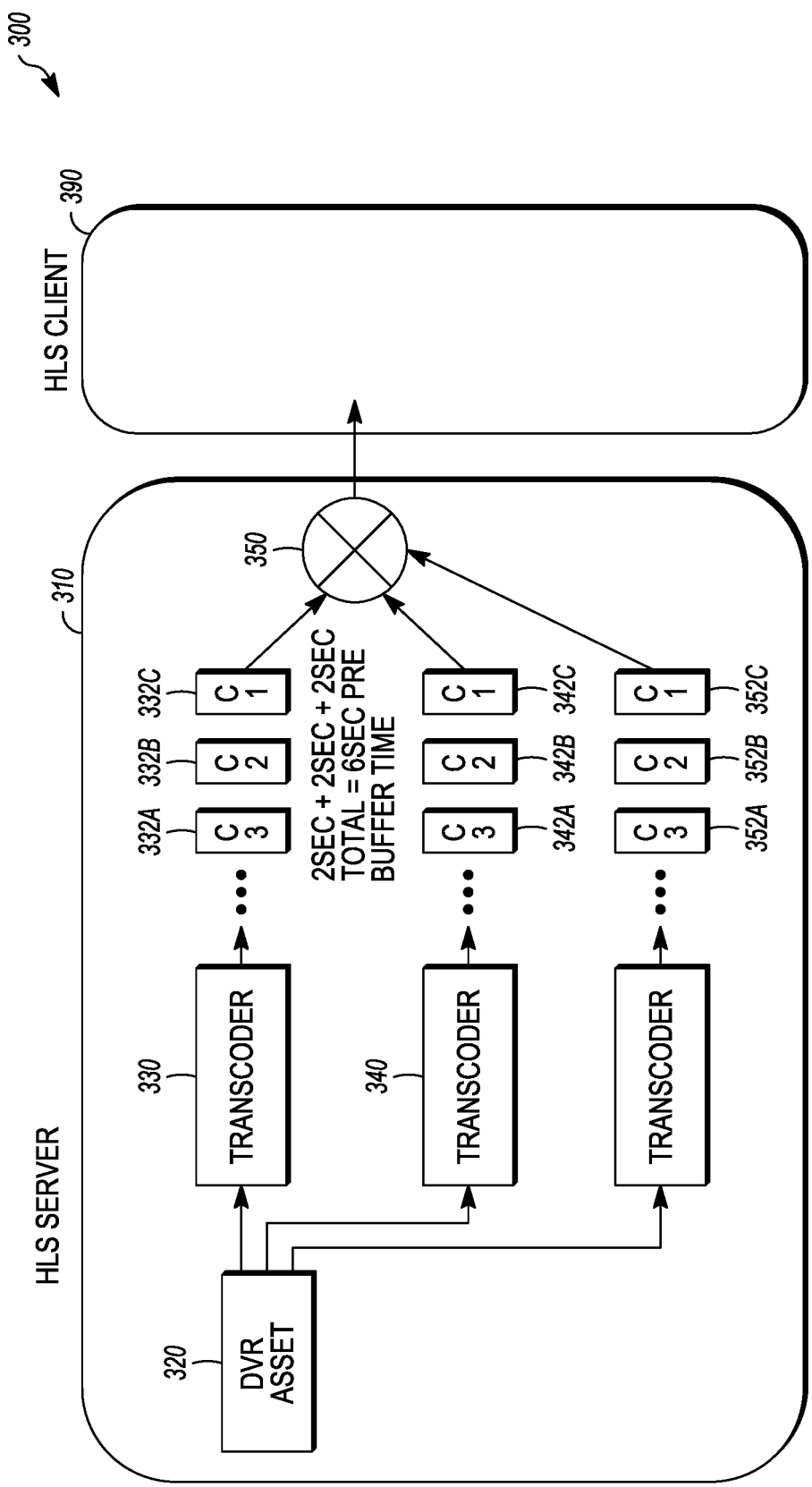
FIG. 3 is a schematic diagram showing the system described herein.

FIG. 3 is a schematic diagram showing the system described herein. In the HLS server 310, the DVR asset 320 is tied to at least two transcoder units, for example, 330, 340 which transcode the DVR asset 320 to the client 390. Two transcoder units 330, 340 are transcoding the same DVR asset 320 to different bitrate profiles for example, 332A, 332B, 332C, 342A, 343B, 343C, 352A, 352B, 352C. Of the at least two transcoder units 330, 340 one is tied to a streaming session which is currently used by the client, for example the HLS client 390, for playback, and the other is a standby unit to support smooth switching to different bitrate profiles whenever required. The standby transcoder is always transcoding at a lower bit rate than currently assigned transcoder. This will allow the adaptive algorithm 350 to decide between the two options at the end of the chunk, based on its most recent measurement. The adaptive algorithm chooses only one of variants of the produced chunks and discards other.

Whenever network congestion or improvement occurs, then the primary transcoder should adopt the bit rate of the preferred chunk or the chosen chunk. The standby, or secondary, transcoder can be used to support a faster response to a sudden drop in bandwidth.

Both the primary and standby transcoder chunks are frame-aligned for smooth playback in client device 390, the alignment being further detailed below.

Whenever the rate switch adjusts to a lower bitrate due to, for example, a change in network conditions, the main transcoder unit will be reconfigured to same bit rate as the standby transcoder and the standby transcoder unit is configured to the next lower bitrate. In an embodiment, if the main transcoder reaches the lowest possible bitrate, then the standby unit can be freed and marked as an idle transcoder unit. In an embodiment, this idle transcoder unit can also be as used as one of the standby units to the other ongoing streaming sessions, if needed.

Whenever the rate switch adjusts to a higher bitrate due to improvement in network conditions, the main transcoder unit can be reconfigured to the next higher bitrate and the standby transcoder unit is configured to the next higher bitrate. If the main transcoder profile was at the lowest bitrate, then a standby unit was being utilized and thus, the system will assign one standby transcoder unit if available and configure said unit to lowest bitrate profile.

When an additional user 390 initiates streaming, for example, for different DVR content or for the same DVR content, a new streaming session requires a transcoder unit and one of the standby transcoders can be freed up from being the standby transcoding unit. The unit can now be used for the new streaming session. As the system is server-controlled adaptive streaming, the client device 390 need not be aware of bitrate switching. Chunk names in playlist file remain same, and the HLS server decides from which transcoder unit (either standby unit or main transcoder unit) to pick the chunk and deliver it to the client. In other words the server knows the chunk number currently being downloaded by the HLS client, and the next chunk is picked from the desired bitrate transcoder unit and delivered to the client device.

In an example embodiment, if a current session is transcoding at a higher bitrate, then standby transcoders are set to transcode profile matching at a bitrate of ¾ e.g. 75% and ½ e.g. 50% of the current bitrate. If the current session is already at a lower bitrate transcoding, then the standby transcoder is set to transcode profile matching at a bitrate of ⁴⁄₃ or 133% and twice e.g. 200%, of current bitrate. Otherwise a standby transcoder is set to transcode profile matching at a bitrate of ¾ and ⁴⁄₃. When network congestion or improvement is detected, the standby transcoder unit is selected based on how good or bad the congestion is, and the standby unit is changed to standby. The main transcoder unit is converted to standby and set to transcode at a bitrate profile as explained above. The current chunk number in progress of being downloaded to the client is checked, and then the playlist file is updated with chunk segments of the new profile with the next sequence number. Thus, whenever the user initiates a new transcode session, one of the standby transcoders units is freed. If the current profile bitrate is high, then the standby unity performing 75% of the bitrate is freed up. Otherwise, the unit performing 200% of the bitrate is freed. These steps are further described below.

Figures 6, 7:
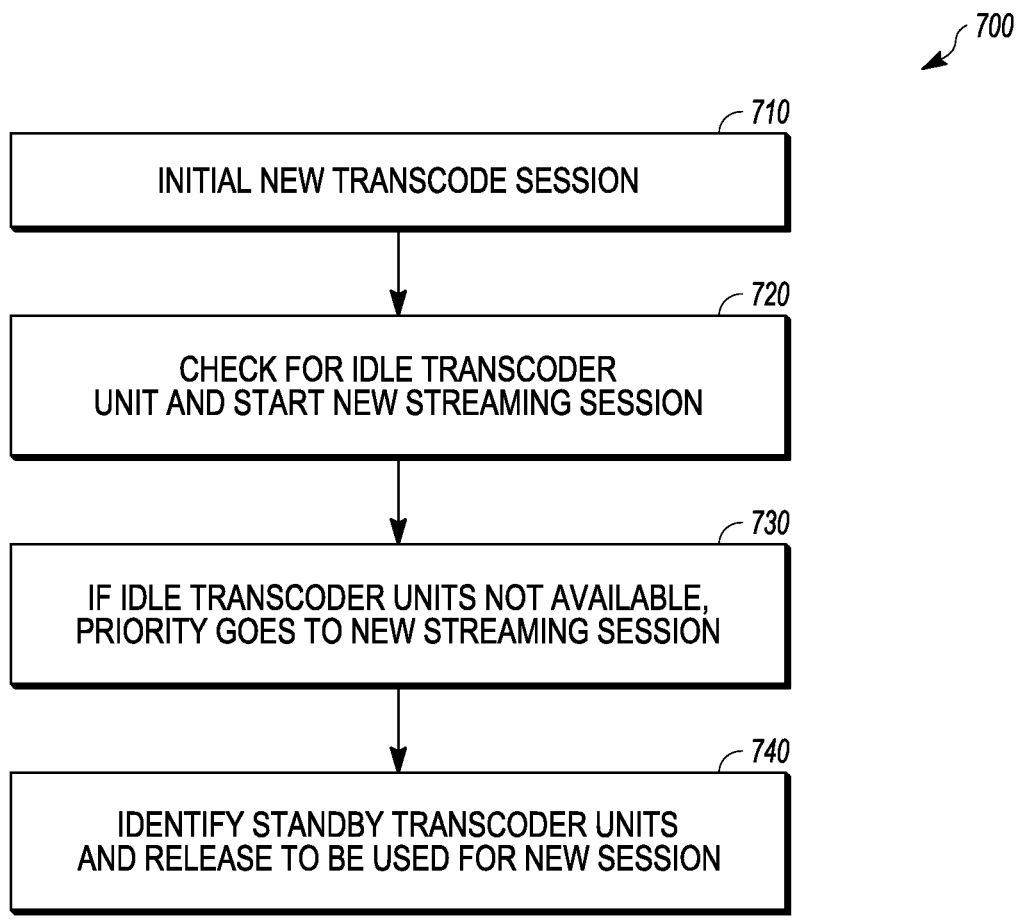
FIG. 6 illustrates one example of pseudocode to effect transcoder assignments and chuck selection.
FIG. 7 is a flowchart illustrating assignment of the idle transcoders.

FIG. 6 illustrates one example of pseudocode to effect the transcoder assignments and chunk selection. As illustrated in the example shown in FIG. 6, a client 390 is currently pulling chunk number 66 of high bitrate profile, and HLS server then switches to a low bitrate profile due to, for example, network congestion. In example playlist file shown, the server picks the next chunk (e.g. 67th) from a low bitrate transcoder unit and names it Chunk67 and serves it to the client device 390. Thus, chunk66 is selected from the main transcoder unit, and chunk67 and chunk68 are picked from the standby transcoder unit. Further, the main transcoder is then reconfigured to same profile as the standby transcoder unit to produce Chunk69 and the next consecutive chunks. The standby unit is reconfigured to the next lower bitrate profile.

Both the main transcoder and the standby transcoder can produce frame-aligned chunks, for example, chunks across parallel transcoder units belonging to same session are aligned with same IDR frame. Blind chunking is not occurring, as it is the case that while switching between chunks belonging to different transcoder units, frame sequences are maintained intact.

Figure 4:
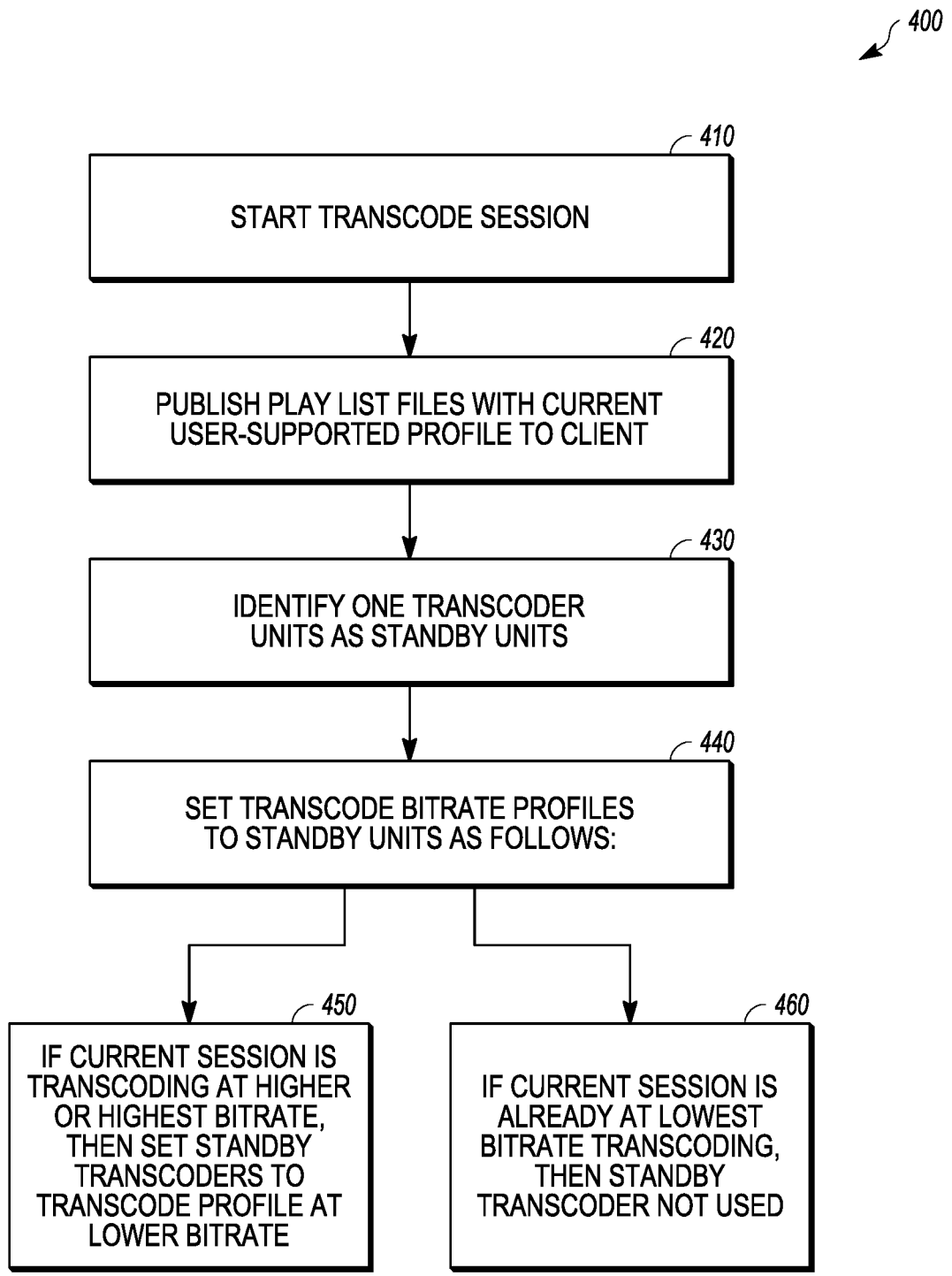
FIG. 4 provides a flowchart of example steps at the HLS Server.

The flowchart in FIG. 4 provides a flowchart of example steps at the Server, for example, the HLS server, as described herein. Process 400 summarizes the process where a remote streaming session using HLS is started. A search for idle transcoder units and the start of a standby transcode session with different bitrate profiles occurs in parallel.

Starting at step 410, a transcode session is started. At step 420, the play list files with a current user-supported profile are published to the client. At 430, one or more transcoder units are identified as standby units. At step 440, transcode bitrate profiles are set to standby units according to the logic at step 450 or 460. At 450, if current session is transcoding at higher or highest bitrate, then standby transcoders are set to a trancode profile at lower bitrate. At 460 if current session is already at lowest bitrate transcoding, then a standby transcoder not used.

In an embodiment, it can be undesirable to want a standby transcoder to generate a higher bit rate because the system generally wants to slowly increase the bitrate when bandwidth goes high, so it could be desirable to let the primary transcoder handle the decision.

Figure 5A:
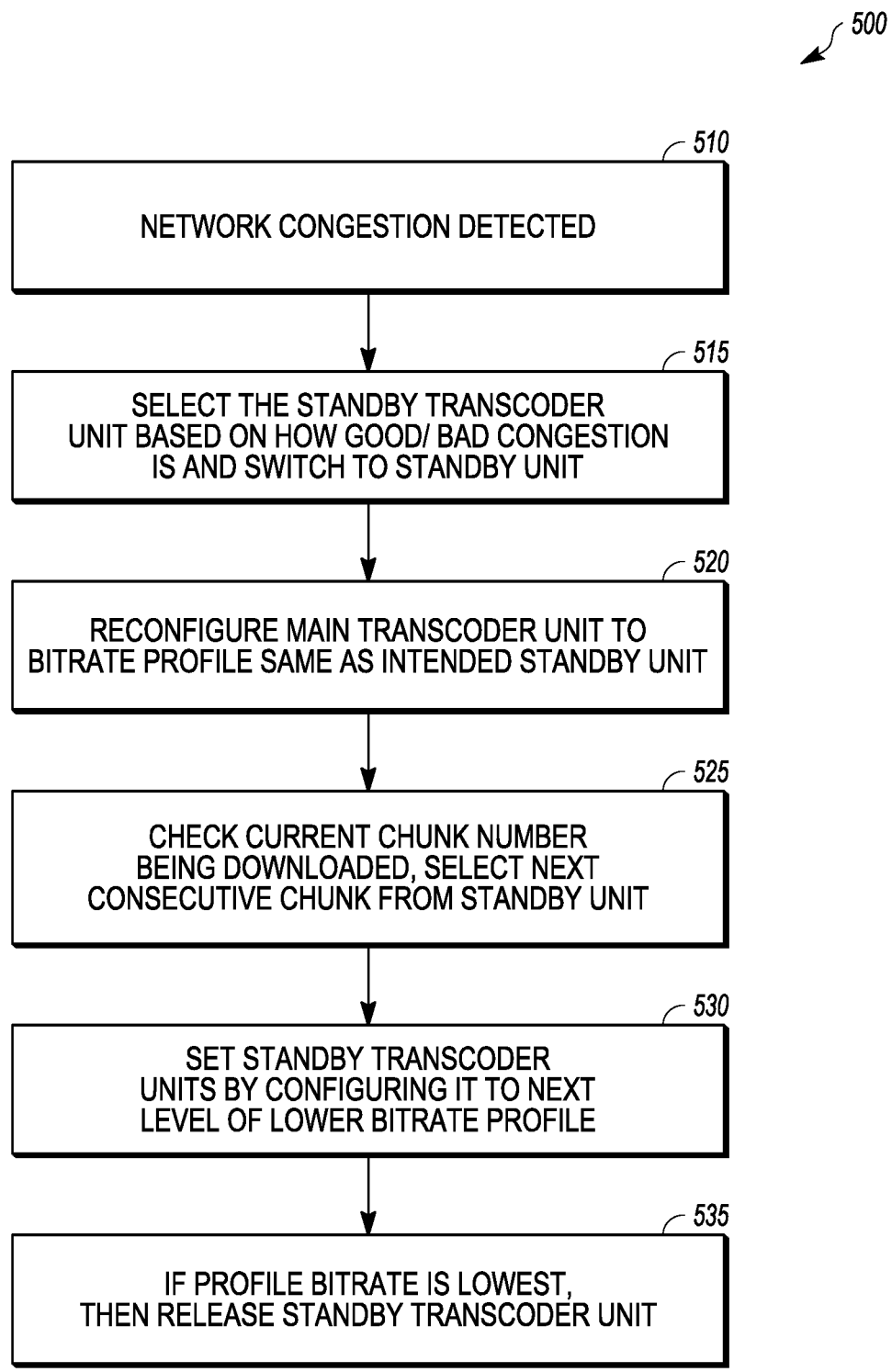
FIGS. 5A and 5B are a flowchart further illustrating the situation when network congestion or improvement is detected.
Figure 5B:
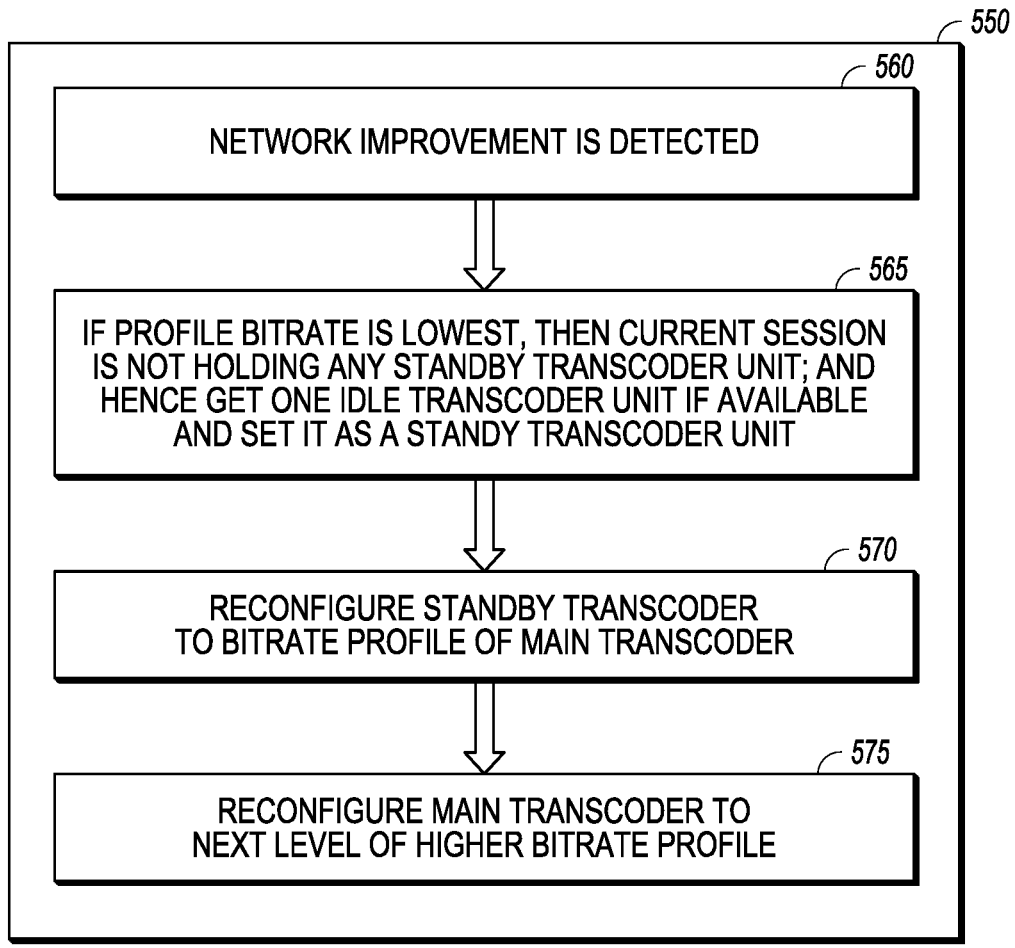

FIGS. 5A and 5B provide a flowchart further illustrating a situation when network congestion or improvement is detected.

Beginning at step 510 of process 500, network congestion/improvement is detected. At step 520, the standby transcoder unit is selected based on how good or bad the congestion is and then switched to a standby unit. In other words next consecutive chunks are picked from the selected standby unit and served to the client device, until the main transcoder unit is reconfigured to a new or the same bitrate profile as the standby unit.

At 530 the main transcoder unit is reconfigured to a bitrate profile that can be the same as the intended standby unit. Advancing to step 540, the current chunk number is checked. This chunk number is in the process of being download by client. Then, the consecutive chunks to be served to client device are picked from selected standby unit. The standby unit has already produced chunks which are ready for consumption.

At 550 the standby transcoder unity is set by configuring it to the next level of a lower bitrate profile, for example, as explained in FIG. 4. At 560, if the profile bitrate reaches a lowest (or bottom-most bitrate), then the standby transcoder unit can be free/released and marked as an idle unit, and can be used by other streaming sessions.

In one embodiment, if the current profile bitrate is at a lowest setting, and network improvement is detected, then one idle unit, if available, is set as a standby transcoder (as the previous session was not holding any standby unit) and is configured to a lowest bitrate profile. The main transcoder unit can be reconfigured to the next higher bitrate profile.

FIG. 7 is a flowchart illustrating assignment of the idle transcoders. Process 700 begins at 710, when a new transcode session is initiated. At 720, there is a check for idle transcoder unity and a new streaming session can be started. At 730, if idle transcoder units are not available, the priority goes to a new streaming session. At 740, the standby transcoder units are identified and released to be used for a new session.

In an embodiment, multiple streaming sessions are ongoing and each of the sessions is marked with priority. Then to free up one of standby units, the system determines the lowest priority streaming profiles and releases the standby unit connected to it.

When a client device closes the streaming session, transcoder units belonging to that session are freed and marked as idle units. The system then notifies the rest of the ongoing streaming sessions about the availability of idle transcoder units, so that ongoing sessions can use it as a standby unit if needed.

Chunks produced by primary vs standby transcoder units should be frame-aligned. Alignment can be an issue when first adding an additional transcoder. Once transcoder output is aligned, keeping alignment is not difficult. The key is to initiate a secondary transcoder prior to a chunk boundary and to carefully track the starting PTS of each chunk. For the initial chunks produced by a secondary transcoder, it will be necessary to discard content up to the PTS cutoff to force alignment across concurrent chunks. Given fixed chunk duration, the next PTS cutoff is predictable, so it can be easier to drop content prior to the desired PTS in the record mechanism.

Moving now to the client side, for example the HLS client side, the system and methods proposed herein do not demand any change on the HLS client, as it is not aware of pre-transcoded content and playlist file. The normal set of steps would be followed, in the course of normal HLS content streaming of DVR asset. These steps can include:

1. Request of DVR asset playback from the media server.
2. Fetch the appropriate playlist file from list of user supported profile playlists as published by the media server.
3. Start fetching the chunks referred in playlist file.
4. Play video of fetched content.

Only the HLS server needs to manage synchronization of pre-transcoded content and continue with further transcoding of content.

As disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable storage media for storing information. The term "computer-readable storage medium" includes, but is not limited to, portable or fixed storage devices, optical storage devices, wireless channels, a SIM card, other smart cards, and various other mediums capable of storing, containing, or carrying instructions or data. However, computer readable storage media do not include transitory forms of storage such as propagating signals, for example.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable storage medium and executed by one or more processors.

Although the subject matter has been described in language specific to structural features and/or methodological acts, it is to be understood that the subject matter defined in the appended claims is not necessarily limited to the specific features or acts described above. Rather, the specific features and acts described.

Accordingly, the present disclosure is not limited to only those implementations described above. Those of skill in the art will appreciate that the various illustrative modules and method steps described in connection with the above described figures and the implementations disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the disclosure. In addition, the grouping of functions within a module or step is for ease of description. Specific functions can be moved from one module or step to another without departing from the disclosure.

The various illustrative modules and method steps described in connection with the implementations disclosed herein can be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general-purpose processor can be a microprocessor, but in the alternative, the processor can be any processor, controller, or microcontroller. A processor can also be implemented as a combination of computing devices, for example, a combination of a DSP and a microprocessor, a plurality of microprocessors, one or more microprocessors in conjunction with a DSP core, or any other such configuration. Additionally, the steps of a method or algorithm described in connection with the implementations disclosed herein can be embodied directly in hardware, in a software module executed by a processor, or in a combination of the two. A software module can reside in computer or machine readable storage media such as RAM memory, flash memory, ROM memory, EPROM memory, EEPROM memory, registers, hard disk, a removable disk, a CD-ROM, or any other form of storage medium including a network storage medium. An example storage medium can be coupled to the processor such that the processor can read information from, and write information to, the storage medium. In the alternative, the storage medium can be integral to the processor. The processor and the storage medium can also reside in an ASIC.

We claim:

1. A real-time transcoding method to provide content by a server to a user, comprising:
    initiating a transcoding session from the server to the user;
    providing playlist files with a current user-supported profile to the server;
    setting a current session bitrate profile based on the current user-supported profile;
    identifying one or more transcoder units as primary and standby transcoder units;
    frame-aligning chunks of the primary and standby transcoder units;
    choosing one of variants of the chunks and discarding other ones of the chunks based on a recent measurement of bandwidth congestion;
    setting a bitrate profile of the one or more standby transcoder units at a lower bitrate than the primary transcoder unit's current session bitrate profile;
    wherein when the current session bitrate profile is at a lowest bitrate profile, the method comprises:
        not using the one or more standby transcoder units; and
        shutting down the standby transcoder units from current operation and continuing operation with only the primary transcoder unit.

2. The method of claim 1, wherein the initiating a transcoding session comprises:
    identifying an idle transcoder unit; and
    assigning the idle transcoder unit to the user for the primary transcoder unit.

3. The method of claim 2, wherein when if an idle transcoder unit is not available, the method comprises:
    identifying the primary transcoder as a priority compared to the standby transcoder unit that is allotted to another user;
    identifying an available active standby transcoder unit;
    shutting down the active standby unit from another user session and assigning the active standby transcoder unit to the user.

4. The method of claim 1, wherein a first standby transcoder unit is set to a bitrate profile of 75% of the current session bitrate profile.

5. The method of claim 4, wherein a second standby transcoder unit is set to a bitrate profile of 50% of the current session bitrate profile.

6. The method of claim 1, further comprising:
    releasing any unused standby transcoder units; and
    unlinking the standby transcoder units and marking the standby transcoder unit as an idle transcoder unit.

* * * * *